July 6, 1937.  H. A. MINOR  2,085,991
DEODORIZER
Filed May 19, 1936
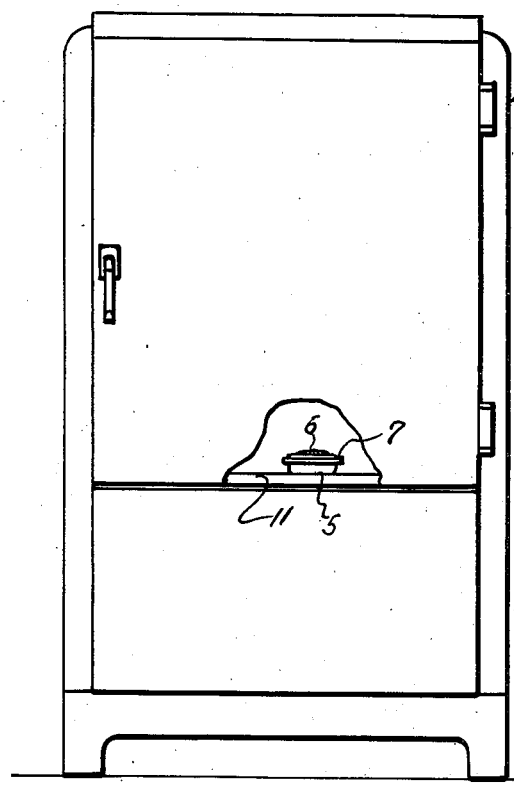
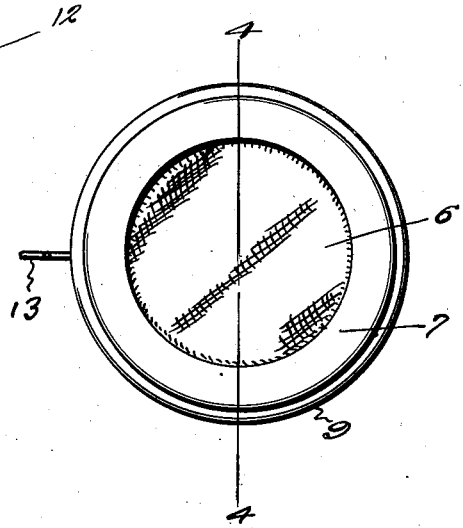
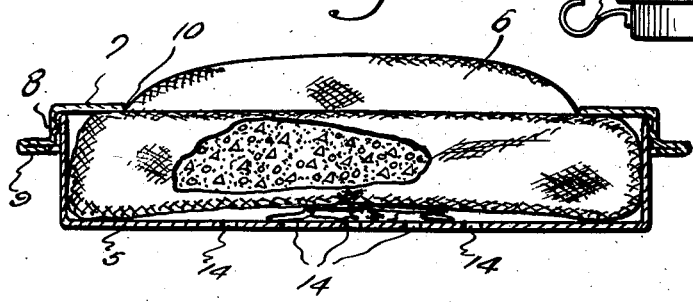
Inventor
Harriet A. Minor
By Clarence A. O'Brien and
Hyman Berman Attorneys Patented July 6, 1937

2,085,991

UNITED STATES PATENT OFFICE 2,085,991

DEODORIZER

Harriet A. Minor, Jeddo, Pa.

Application May 19, 1936, Serial No. 80,609

2 Claims. (Cl. 183—4)

This invention relates to deodorizing devices and the object of the invention is to provide a deodorizer which may be readily placed in a refrigerator for maintaining the interior of the refrigerator and the materials being preserved therein free from obnoxious odors.

In accordance with the present invention a deodorizer is provided that is characterized by simplicity of construction and which can be readily placed within or removed from the refrigerator and which can be shifted about within the refrigerator to occupy any convenient place therein and to require but little storage space in the refrigerator.

The invention together with its objects and advantages will be best understood from a study of the following description taken in connection with the accompanying drawing wherein:—

Figure 1 is a front elevational view of a closed refrigerator with a portion of the door broken away to show the deodorizer located therein.

Figure 2 is a top plan view of the deodorizer.

Figure 3 is an edge elevational view of the deodorizer.

Figure 4 is a sectional view taken substantially on the line 4—4 of Figure 2.

Referring to the drawing by reference numerals it will be seen that the deodorizer comprises a pan or receptacle 5 formed of metal or other suitable material and in the present instance the pan 5 is circular.

The pan 5 is adapted to have placed therein the deodorizing element 6 which in the present instance consists of a sack in which is placed a suitable deodorizing medium, as for example a mixture of brown sugar, yellow meal, and salt in equal parts.

For retaining the element 6 in the pan 5 there is provided for the pan a lid 7 which has a depending flange 8 that telescopes the peripheral wall of the pan 5 and terminates in an annular outstanding flange extension 9 which serves to facilitate the placing of the lid 7 or the removal of the same.

At the center thereof the lid 7 is provided with a circular opening 10 and the sack and its contents 6 are of such a size that when the lid 7 is placed on the pan 5 an intermediate portion of the sack 6 with its contents is forced to project upwardly and outwardly of the casing through the opening 10 in the cap as shown in the drawing.

As shown in Figure 1 the deodorizer may be placed on a shelf 11 within the refrigerator 12 or if found desirable the deodorizer may be suspended in any suitable manner within the refrigerator and to this end the pan 5 is provided with a hook 13 that projects radially outward from the peripheral wall of the pan 5 and which may be engaged with a reticulated tray with which the refrigerator is usually provided or with any other suitable suspension element within the refrigerator.

It will be apparent that when the device is suitably disposed within the refrigerator the air interiorly within the refrigerator will be kept clean and sweet smelling.

In connection with the above it will be also noted that the pan 5 in the bottom thereof is provided with perforations 14 through which the air may pass into the pan and filter through the sack 6 and its contents, to the end that the air within the refrigerator will be permeated by the odor thrown off from the contents of the sack 6 thus maintaining the interior clean and fresh.

Having thus described the invention what is claimed as new is:—

1. In a deodorizer, a receptacle having a perforated bottom, a sack arranged within the receptacle and containing an air-purifying substance, said receptacle being open at its top and a lid for the receptacle having a central opening therein through which a portion of the sack and its contents projects incidental to a compression of the sack and its contents between the bottom of the receptacle and the crown of said lid.

2. In a deodorizer for refrigerators, a receptacle for disposition within the refrigerator and a sack arranged within the receptacle and containing an air-purifying substance, said receptacle having a perforated bottom and a lid provided with an opening, and a suspension hook extending radially from the peripheral wall of the receptacle.

HARRIET A. MINOR.